United States Patent
Imashige

(10) Patent No.: US 7,134,519 B2
(45) Date of Patent: Nov. 14, 2006

(54) WORKING MACHINE

(75) Inventor: Hirokazu Imashige, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 10/878,054

(22) Filed: Jun. 29, 2004

(65) Prior Publication Data

US 2005/0000746 A1    Jan. 6, 2005

(30) Foreign Application Priority Data

Jul. 1, 2003    (JP) ............................. 2003-270180

(51) Int. Cl.
B62D 25/10 (2006.01)

(52) U.S. Cl. ................. 180/69.24; 180/89.17

(58) Field of Classification Search ............ 180/69.24, 180/69.21, 89.17, 69.2, 89.13; 296/190.08, 296/190.11
See application file for complete search history.

(56) References Cited

U.S. PATENT DOCUMENTS

| | | | | |
|---|---|---|---|---|
| 3,802,022 A | * | 4/1974 | Fleming | 414/338 |
| 4,359,121 A | * | 11/1982 | Messner et al. | 180/69.21 |
| 4,506,750 A | * | 3/1985 | Leskovec | 180/69.21 |
| 4,616,872 A | * | 10/1986 | Akira et al. | 296/190.11 |
| 4,889,203 A | | 12/1989 | Hagarty | |
| 5,303,792 A | * | 4/1994 | Shimizu | 180/69.21 |
| 5,370,847 A | | 12/1994 | Lee | |
| 5,671,820 A | * | 9/1997 | Kobayashi et al. | 180/69.21 |
| 5,715,615 A | * | 2/1998 | Murakami et al. | 180/69.21 |
| 5,810,423 A | * | 9/1998 | Brackmann et al. | 296/146.2 |
| 5,826,440 A | * | 10/1998 | Okada et al. | 62/239 |
| 6,017,083 A | * | 1/2000 | Edgeller | 180/69.24 |
| 6,058,903 A | * | 5/2000 | Downham | 180/69.2 |
| 6,135,223 A | * | 10/2000 | Miyachi et al. | 180/69.21 |
| 6,194,997 B1 | * | 2/2001 | Buchner et al. | 340/426.26 |
| 6,213,235 B1 | * | 4/2001 | Elhardt et al. | 180/69.2 |
| 6,471,837 B1 | | 10/2002 | Hans et al. | |
| 6,626,256 B1 | * | 9/2003 | Dennison et al. | 180/69.24 |
| 6,634,449 B1 | * | 10/2003 | Randolph | 180/69.24 |

FOREIGN PATENT DOCUMENTS

| | | |
|---|---|---|
| EP | 0 743 401 | 11/1996 |
| FR | 2 629 416 | 10/1989 |
| GB | 2 007 604 | 5/1979 |
| JP | 10-219741 | 8/1998 |
| JP | 10-331196 | 12/1998 |
| JP | 2003-64723 | 3/2003 |

* cited by examiner

*Primary Examiner*—Hau Phan
(74) *Attorney, Agent, or Firm*—Oblon, Spivak, McClelland, Maier & Neustadt, P.C.

(57) ABSTRACT

The present invention is a working machine in which apparatus disposed in an outer peripheral portion of the base machine is covered with a openable guard cover, a window for maintenance, which is opened and closed by a window cover, is provided in front surface of the guard cover, and a locking mechanism, which locks the guard cover in a closed mode and unlocks the guard cover by being operated from the outside, is provided in the inside of the window. According to the present invention, the locking mechanism for the guard cover can be simplified and the guard cover can be made hard to be opened by unauthorized persons.

6 Claims, 4 Drawing Sheets

WORKING MACHINE

BACKGROUND OF THE INVENTION

1. Field of the Invention

The present invention relates to a working machine such as a hydraulic excavator including a guard cover, which covers pieces of apparatus.

2. Description of the Related Art

In an upper rotating body of a hydraulic excavator are disposed pieces of apparatus such as a working oil tank, a radiator, a main control valve, a multi control valve and a selector valve and the like. These are covered with a guard cover, and the maintenance of the apparatus or the like in the cover is performed by opening the cover.

In this case, the guard cover is large and heavy, its opening and closing are troublesome and further a space required for opening and closing the cover is large. Thus, a technology that an openable small window is provided in the cover and the apparatus or the like, which require daily maintenance, are provided in the guard cover so as to face this small window, has been known (see Japanese Patent Laid-Open Publication No. Hei. 10-219741).

Since the hydraulic excavator can be often left at the site after the completion of working, an openable locking mechanism by a key is provided in the cover so that the apparatus or the like are not operated freely by unauthorized persons. Further, in the case of providing the small window, a cover for opening and closing this small window is needed and use of the same locking mechanism in this small cover is also needed.

Namely, two sorts of locking mechanisms for the guard cover and the small window cover are required.

Here, if a key for both locking mechanisms is used in common, only one key is all that is required. However, the both locking mechanisms each require a key cylinder and a locking mechanism enough to satisfy at least safety standards.

Further, to attach a key cylinder a key-operating portion for the cylinder must be fixed to the guard cover. Thus, working for the cover is needed. The working machine of the related art has been disadvantageous in the points of the production steps, cost and appearance of the machine.

It is noted that even if another locking mechanism such as a card open-close type, a dial key or the like is used, it is not changed that two sorts of independent locking mechanisms are required.

Further, since the position of a locking mechanism of the guard cover and its open-close method can be seen from the outside easily by a key hole or the like, there was a problem that the possibility of breaking the locking by unauthorized persons is high.

SUMMARY OF THE INVENTION

The object of the present invention is to provide a working machine, which can simplify a locking mechanism for a guard cover and in which the guard cover is difficult to be opened by unauthorized persons.

The working machine according to the present invention has the following basic configurations.

Namely, the working machine includes an openable guard cover attached to an outer peripheral portion of main body of the working machine, which has a window for performing maintenance of apparatus and covers the apparatus; a window cover provided with this guard cover for opening and closing the window; and a guard cover locking mechanism provided within the guard cover, which locks the guard cover in a closed mode. This guard cover locking mechanism allows a locking operation and an unlocking operation from the outside of the guard cover through the window.

According to the present invention, since a guard cover including a locking mechanism, which is locking/unlocking operated, is provided with the window, which is opened and closed by the window cover and a locking mechanism for the guard cover is provided inside the window, only after the window is opened the entire guard cover can be opened. Therefore, if a locking mechanism for the window cover, which satisfies the safety standards, is used, a simplified locking mechanism for the guard cover may be used.

Thus the structure of the locking mechanism for the guard cover is simplified and the working machine of the present invention is advantageous in points of the production steps, cost of the machine, and for aesthetic purposes.

Further, the locking mechanism for the guard cover is a kind of key concealed within the window cover, and the guard cover is difficult to be opened by unauthorized persons. Thus, the possibility of operating inner apparatus without authorized persons' permission becomes low.

DESCRIPTION OF THE PREFERRED EMBODIMENTS

Figure 1:
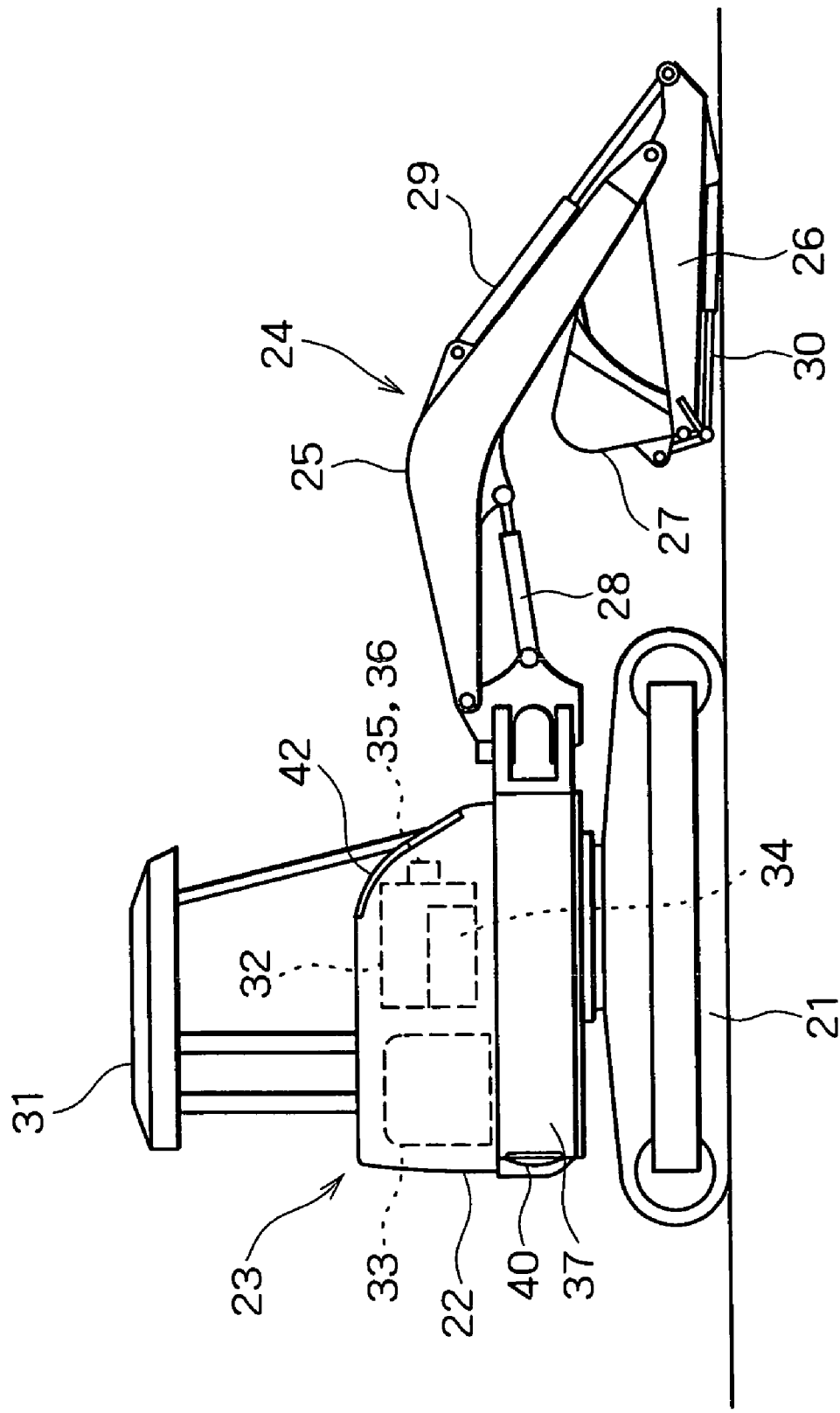
FIG. 1 is a schematic side view of the entire hydraulic excavator according to the present invention.

A working machine according to the present invention will be described with reference to embodiments shown in the drawings below.

In the following embodiments, a hydraulic excavator is illustrated as an application object.

In this hydraulic excavator a base machine 23 is formed in such a manner that an upper rotating body 22 is rotatably mounted on a crawler type lower traveling body 21 around its vertical shaft, as shown in FIG. 1. Onto this base machine 23 are attached a working attachment 24 comprising a boom 25, an arm 26, a bucket 27, hydraulic cylinders 28, 29, 30 which operate them, and a swing cylinder (not shown), which swings the entire attachment in opposite directions.

Figure 2:
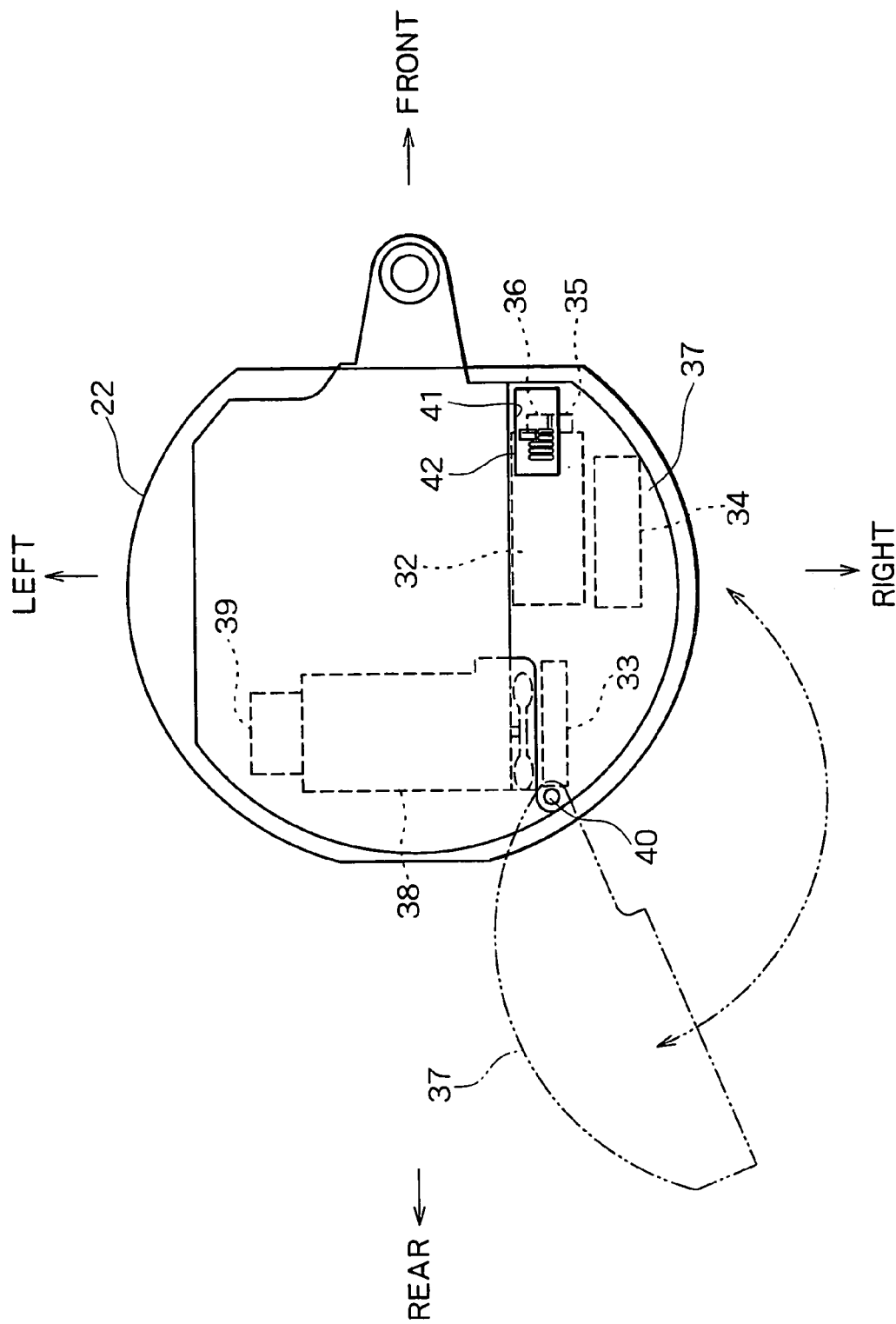
FIG. 2 is a plan view showing an arrangement of an apparatus in an upper rotating body of the hydraulic excavator.
Figure 3:
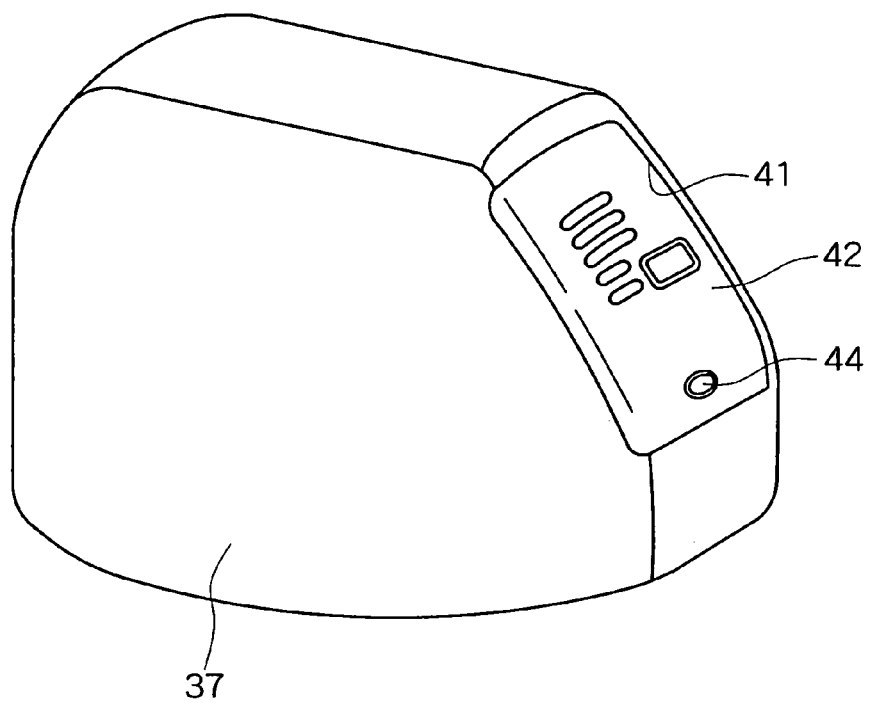
FIG. 3 is a perspective view showing only a guard cover portion of the hydraulic excavator.

In this hydraulic excavator, as shown in FIGS. 1 and 2, the following apparatuses are disposed on an outer peripheral portion of the upper rotating body 22 (for example, a right side portion when an operator sitting on the operator's seat viewed. The example will be illustrated and explained in the following descriptions). Namely, as these apparatus or the like, a working oil tank 32, a radiator 33, a main control valve 34, which controls the operation of each hydraulic actuator, a multi control valve 35, which changes the relationships between a lever, which is operated in accordance with the kinds of working attachment 24 and an operator's choice, and an actuator, which is moved, and a selector valve 36, which changes oil flow in accordance with the kinds of the working attachment 24 and the like, are disposed. These apparatus are covered with a guard cover 37.

In FIG. 2, a reference numeral 38 denotes an engine, and 39 a hydraulic pump.

A rear end side of the guard cover 37 is rotatably attached to the upper rotating body 22 in an openable manner by a hinge 40 (shown in FIG. 2). The guard cover 37 is locked and unlocked by a guard cover locking mechanism (described later) provided on its front end side.

On a front portion of the guard cover 37 is provided a window 41 which is an elongated rectangle on a front side of the machine in an open mode, as shown in FIG. 2 or later. This window 41 is opened and closed by a window cover 42.

This window cover 42 is rotatably attached to the guard cover 37 (an opening edge portion of the window 41) with a hinge 43 (see FIGS. 4 and 5) in an openable manner on one side of the window cover 42. Then, this window cover 42 is opened to perform daily maintenance, and other maintenance is performed by opening the guard cover 37. According to a detailed explanation, the apparatus or the like covered with the guard cover 37 are separated to high frequency maintenance apparatus, which require substantially daily maintenance, and other low frequency maintenance apparatus which do not always require daily maintenance. As the high frequency maintenance apparatus, a level gauge 32a (shown in FIGS. 4 and 5) of the working oil tank 32, the main control valve 34, the multi control valve 35 and the selector valve 36 are included. These apparatus are disposed in a front portion facing the window 41. Namely, the high frequency maintenance apparatus are disposed in such a manner that the maintenance of them can be performed through the window.

Figure 4:
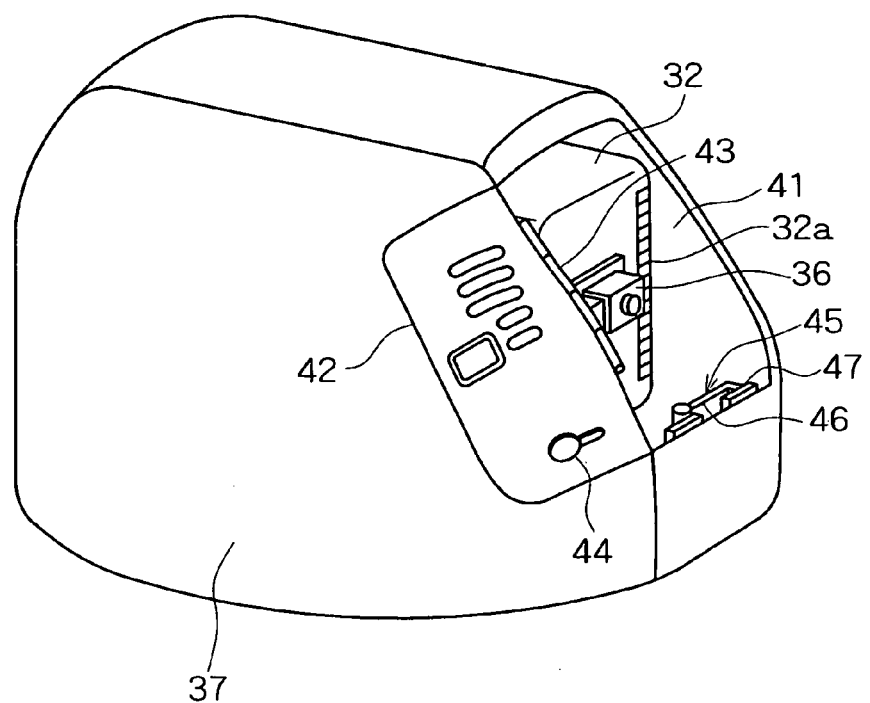
FIG. 4 is a perspective view of a state where a window of the guard cover is opened.

In this arrangement the maintenance of the high frequency maintenance apparatus can be easily performed while only the window 41 is opened as shown in FIG. 4.

Further, it is preferable that the high frequency maintenance apparatus are attached to an outer wall surface of the working oil tank 32. In the embodiment, the main control valve 34 is attached to a side of the working oil tank 32, and the multi control valve 35 and the selector valve 36 are attached to a front surface of the tank 32, respectively.

Namely, a configuration is adopted that the working oil tank 32 is also served as a mount bracket for the high frequency maintenance apparatus. Thus, this configuration has smaller number of members, which interfere with maintenance, as compared with a case where a separate and exclusive bracket is provided for the mounting of each of the apparatus. Therefore, the maintenance of high frequency apparatus becomes easy even through the window 41.

On the other hand, the low frequency maintenance apparatus are disposed in other vacant space appropriately and maintenance thereof is performed by opening the entire guard cover 37 if necessary.

The window cover 42 is locked in the closed mode by a key open and close type window cover locking mechanism 44 provided with a key hole on a front surface of the window cover 42, and is unlocked by key's rotary operation. Thus, the window cover locking mechanism 44 locks the window cover 42 in the locked mode and unlocks it in an unlocked mode by the cover 37's key operation from the outside.

As the window cover locking mechanism 44, as shown in drawings, ones having a configuration that a tongue piece key lever is engaged/disengaged with the inside of a lower side edge of the window 41 by a key operation and having a configuration that a rod is extended and retracted by a key operation to engage/disengage the lever with a side edge inside of the window 41, can be used.

A guard cover locking mechanism 45, which locks the guard cover 37 in a locked mode, comprises an elongated ring-shaped fastener 46 provided in a lower side edge of the window 41 in the guard cover 37 so as to be operated from the outside, a catch 47, provided on the upper rotating body 22 side in accordance with this fastener 46. The fastener 46 is hooked on the catch 47 to be tensed so that the guard cover 37 is locked in the closed mode. On the other hand, when the fastener 46 is released from the catch 47 to be unlocked.

It is noted that this guard cover locking mechanism 45 may be locked/unlocked by manual operation, or a bolt key or the like can be also used.

In this configuration the maintenance of the high frequency maintenance apparatus (the level gauge 32a of the working oil tank 32, the main control valve 34, the multi control valve 35, the selector valve 36) can be easily performed by opening only the window cover 42 as described above.

Accordingly, the high frequency maintenance apparatus including at least one of the selector valve 36, the multi control valve 35, and the level gauge 32a of the working oil tank 32 are disposed in conditions where they can be maintained through the window 41. Thus, the facility of maintenance due to provision of the window 41, which is an essential object, can be ensured.

The guard cover locking mechanism 45 is provided in an inner side edge of the window 41 in conditions where it is seen from an opened window 41. The mechanism 45 may be located within a visible scope through the window 41 in an open mode.

On the other hand, when the maintenance of the low frequency maintenance apparatus such as a radiator 33 is performed, the window cover 42 is first opened.

Figure 5:
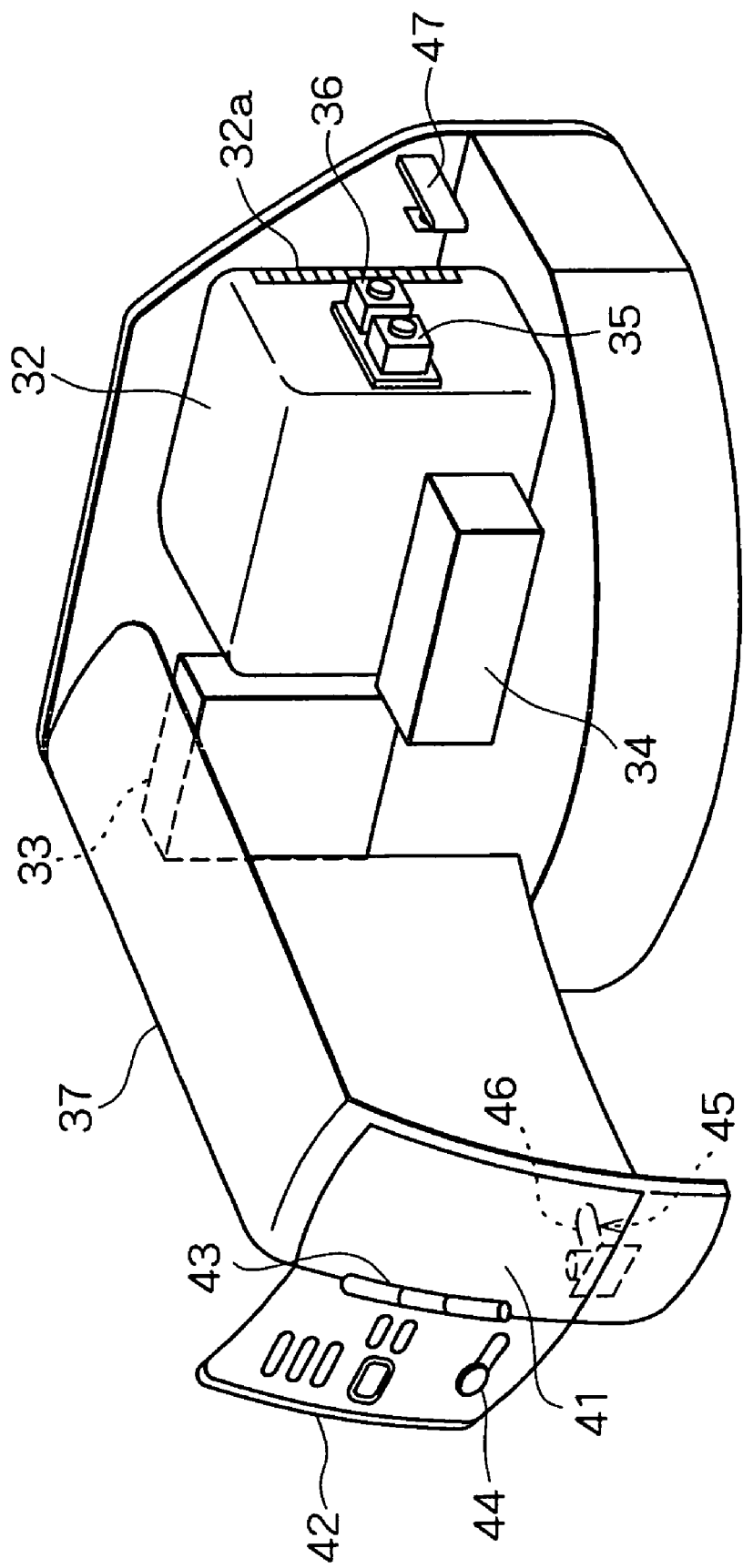
FIG. 5 is a perspective view of a state where the entire guard cover is opened.

In this state the guard cover locking mechanism 45, positioned at a lower side edge of the window 41, is seen from the outside as shown in FIG. 4, and is operable. Thus, after the guard cover locking mechanism 44 is operated to be unlocked, the entire guard cover 37 may be opened as shown in FIG. 5. In this case, since the guard cover locking mechanism 45 is seen from the outside of the guard cover 37 in a condition that the window cover 42 is opened, and the presence of the guard cover 37 can be found at a glance, an inexperienced worker cannot be bewildered.

Further, in this configuration, only after the window cover 42 is opened, the entire guard cover 37 can be opened. Therefore, if only the window cover locking mechanism 44 uses a high safety key type, the guard cover locking mechanism 45 does not need strictness unlike the window cover locking mechanism 44. Thus, the window cover locking mechanism 44 can take a simple structure, which does not use a locking key.

Accordingly, the structure of the window cover locking mechanism 44 is simplified and the working machine of the present invention is advantageous in points of the production steps, cost and appearance of the machine.

Further, since the guard cover locking mechanism 45 is concealed by the window cover 42, it provides for a kind of concealed key, which cannot be seen or unlocked from the outside. Thus this invention can prevent unauthorized persons from opening the guard cover 37 freely, and the possibility of operating inner apparatus without authorized persons' permission becomes low.

OTHER EMBODIMENTS (1) In the above described embodiment the guard cover locking mechanism 45 is provided in a lower side edge of the window 41. However, it may be provided in an upper side edge, or one left or right side edge thereof.

Further, the guard cover locking mechanism 45 is preferably provided in a position where the presence of the mechanism 45 is found at a glance in the condition that the window cover 42 is opened as in the above described embodiment. On the contrary, the guard cover locking mechanism 45 may be provided in a position where, although it is not conspicuous, an operation is possible, so that the position of the mechanism 45 is hard to be found by unauthorized persons.

(2) The window 41 is not limited to a front surface of the guard cover 37 but it may be provided on a side, or a back surface or an upper surface thereof.

(3) As the window cover 42, a slide openable type may be used instead of the hinge open and close type according to the above-mentioned embodiment. The window cover locking mechanism 43 is not limited to the key openable type, but a card openable type or a dial key type or the like may be used.

(4) In addition to the level gauge 32a of the working oil tank 32, the main control valve 34, the multi control valve 35, and the selector valve 36, or instead of any of them, a fuel level gauge or a fuel supply port may be disposed at a position where it can be found or oil supply can be performed through the window 41, as the high frequency maintenance apparatus.

(5) The present invention can be adapted to not only hydraulic excavator but also other working machines such as a movable crusher and the like, which crushes concrete mass.

Although the invention has been described with reference to the preferred embodiments in the attached figures, it is noted that equivalents may be employed and substitutions made herein without departing from the scope of the invention as recited in the claims.

I claim:

1. A working machine comprising:
    a base machine, which is formed in such a manner that an upper rotating body is rotatably mounted on a crawler type lower traveling body around a vertical shaft, the base machine including a working attachment comprising a boom, an arm, a bucket, and driving motors for the boom, arm and bucket, said upper rotating body having an operator's cab on an upper portion of said upper rotating body, said upper rotating body having functional apparatus which requires maintenance comprising an openable guard cover, which covers the apparatus, attached to an outer peripheral portion of the upper rotating body of said working machine;
    a window provided in said guard cover for maintenance of said apparatus;
    a window cover provided with said guard cover, said window cover being provided to open or close said window independently of opening or closing of said guard cover; and
    a guard cover locking mechanism, provided within said guard cover, which locks said guard cover in a closed mode, said guard cover locking mechanism being located within said guard cover to allow a locking and an unlocking operation from the outside of said guard cover only through said window.

2. The working machine according to claim 1, wherein a window cover locking mechanism is provided, which locks said window cover in a locked mode and unlocks said window cover in an unlocked mode by a key operation from the outside of said guard cover.

3. The working machine according to claim 1, wherein said guard cover locking mechanism is provided in an inner side edge of said window in such a manner that the mechanism is located within a visible scope through said window in an open mode.

4. The working machine according to claim 1, wherein the apparatus covered with said guard cover are separated into high frequency maintenance apparatus and low frequency maintenance apparatus on the basis of frequency of maintenance as a standard, and said high frequency maintenance apparatus are disposed in such a manner that a maintenance work can be done through said window.

5. The working machine according to claim 4, wherein said high frequency maintenance apparatus include one of a selector valve which changes a direction of oil flow in accordance with an working attachment attached to said body, a multi control valve which changes an operating pattern of an actuator for said working attachment, and a level gauge for a working oil tank.

6. The working machine according to claim 4, wherein said working oil tank is disposed facing said window and said high frequency maintenance apparatus are attached to an outer wall surface of the working oil tank.

* * * * *